United States Patent

[11] 3,600,894

[72] Inventor Charles R. McClain
 Chula Vista, Calif.
[21] Appl. No. 32,562
[22] Filed Apr. 28, 1970
[45] Patented Aug. 24, 1971
[73] Assignee Rohr Corporation
 Chula Vista, Calif.

[54] THRUST REVERSING APPARATUS
 9 Claims, 4 Drawing Figs.
[52] U.S. Cl. .................................................. 60/226
[51] Int. Cl. .................................................. F02k 3/02
[50] Field of Search ..................................... 60/229,
 228, 226, 224; 239/265.33, 265.29, 265.31,
 265.37

[56] References Cited
 UNITED STATES PATENTS
3,262,268 7/1966 Beavers ....................... 60/226 A
3,500,644 3/1970 Hom ............................ 60/226 A
3,503,211 3/1970 Medawar ..................... 60/226 A
3,511,055 5/1970 Timms ......................... 60/226 A
3,541,794 11/1970 Johnston ...................... 60/226 A Primary Examiner—Clarence R. Gordon
Attorney—George E. Pearson ABSTRACT: Front fan jet engine has cowl surrounding engine and terminating in jet exhaust nozzle. Elongate shroud surrounds fan and engine to define annular duct for fan air terminating forward of exit end of nozzle. Shroud is divided near aft end into forward section and aft section spaced rearward to define annular outflow passage. Sleeve is stowed position overlies outer end of passage to block flow and deploys axially rearward to permit flow. Blocker doors pivoted at their aft ends to forward end of aft section close inner end of passage when stowed and swing to converge inwardly and contact cowl to block flow through aft section and divert it through passage. Ramps pivoted at their aft ends to intermediate point of doors and at their forward ends to forward end of sleeve act as links to move doors in response to movement of sleeve and deploy to diverge forwardly and redirect airstream with forward component to produce reverse thrust. Leading edge of sleeve forms annular end plate to increase forward flow component of exiting airstream.

PATENTED AUG 24 1971 3,600,894

INVENTOR.
CHARLES R. McCLAIN

BY

George E. Pearson
ATTORNEY

INVENTOR.
CHARLES R. McCLAIN
BY
George E. Pearson
ATTORNEY

THRUST REVERSING APPARATUS

BACKGROUND OF THE INVENTION

This invention lies in the field of gas turbine engines, commonly called jet engines, which produce reaction thrust by ejecting a high-velocity stream of gas from the exhaust nozzle of the gas turbine, and is directed to thrust reversing apparatus for the front fan type of jet engine in which a nacelle or shroud surrounds the engine and is spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the turbine.

Airplanes equipped with jet engines have high landing speeds which place a heavy burden on their wheel brakes. To reduce this burden, most such airplanes are provided with means to reverse the direction of flow of the jetstream during landing runs to produce a reverse thrust. Many different types of thrust reversers have been developed and used for this purpose. All of them utilize a basic principle of blocking rearward flow of the jetstream and diverting it laterally and forwardly. One type uses blocker doors swung directly behind the jet nozzle and diverging forwardly. Another type uses openings in the sidewalls of the nozzle or a surrounding shroud together with blocker doors which swing toward the engine axis to block rearward flow and extend outward to direct the diverted flow laterally and forwardly. Still another type utilizes cascade sets in the sidewalls of the jet or shroud with various means to block rearward flow and uncover the cascades. All of these have various merits and have been used successfully. Their principal problems have been cost, weight, and complexity with resultant high maintenance expense.

SUMMARY OF THE INVENTION

The present invention obtains the benefits mentioned above while providing an apparatus which adds very little weight or complexity and is highly reliable in operation. Generally stated, the apparatus includes an elongate shroud which surrounds the fan and engine and provides an annular duct for the rearward flow of fan air, the duct terminating forward of the exit end of the exhaust gas nozzle. The shroud is divided near its aft end into a forward section and a short aft section which is spaced rearward to define between the sections a peripheral outflow passage. The inner and outer walls of the shroud are radially spaced but converge in the aft section to produce a thin streamlined trailing edge. In the presently preferred form, closure means in the form of a sleeve overlies the outer end of the passage in stowed position and defines the contour of the outer wall between the forward and aft sections. It deploys axially rearward to uncover the passage for reverse thrust flow.

A plurality of blocker doors are pivotally mounted at their aft ends to the forward end of the aft section and, in their stowed position, overlie the inner end of the outflow passage and define the contour of the inner wall of the shroud between the fore and aft sections. In deploying, the doors swing inward to forwardly converging position with their inner ends in contact with the engine cowl to block rearward flow of the airstream through the aft section of the shroud and divert it into the outflow passage.

A plurality of panels, termed "ramps," are pivotally connected at their aft ends to intermediate portions of the doors and at their forward ends to the forward end of the sleeve. In stowed position they lie entirely in the passage between the doors and the sleeve and are not subjected to the airstream flow through the shroud. Because of the described connections, the ramps act as force-transmitting links to cause the doors to stow and deploy in response to stowing and deploying movement of the sleeve. When the sleeve and doors are deployed they also cause deploying movement of the ramps to forwardly diverging position, and they then redirect the airstream outward and forward to produce a reverse thrust effect.

The leading edge of the sleeve extends a short distance forward of the pivotal connections to the ramps. As a result, in the deployed position the leading edge forms an annular deflecting end plate and greatly increases the forward flow component of the airstream directed to it by the ramps.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENT

Figure 1:
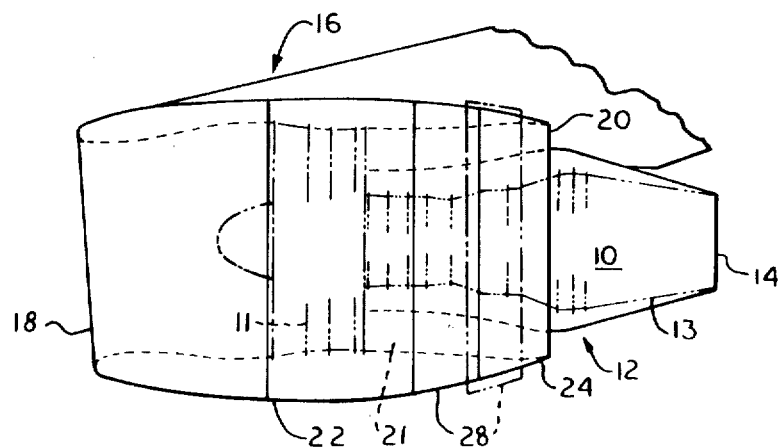
FIG. 1 is a schematic side-elevational view showing a complete engine installation with the sleeve in stowed position.

The apparatus of this invention is generally schematically illustrated in FIG. 1, in which the engine 10 is provided with a front fan 11. The engine 10 has a cowl 12 terminating rearwardly in a rearwardly discharging exhaust gas nozzle 13 which has an exit end 14. An elongate shroud 16, which is generally coaxial with the engine, surrounds the engine and fan with its forward end 18 well ahead of the fan to constitute an air inlet and its aft end 20 terminating forward of the exit end 14 of the nozzle. As shown, it terminates at or near the transverse plane of maximum diameter of the engine cowl to define a convergent jet airflow passage 21 for the air which is directly driven rearward by the fan and does not pass through the turbine.

Figure 3:
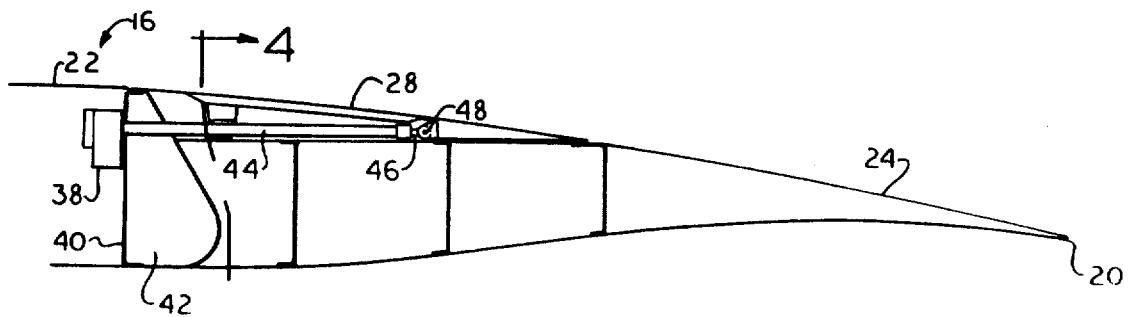
FIG. 3 is a view similar to FIG. 2 but at a peripherally spaced location showing an actuating means.
Figure 2:
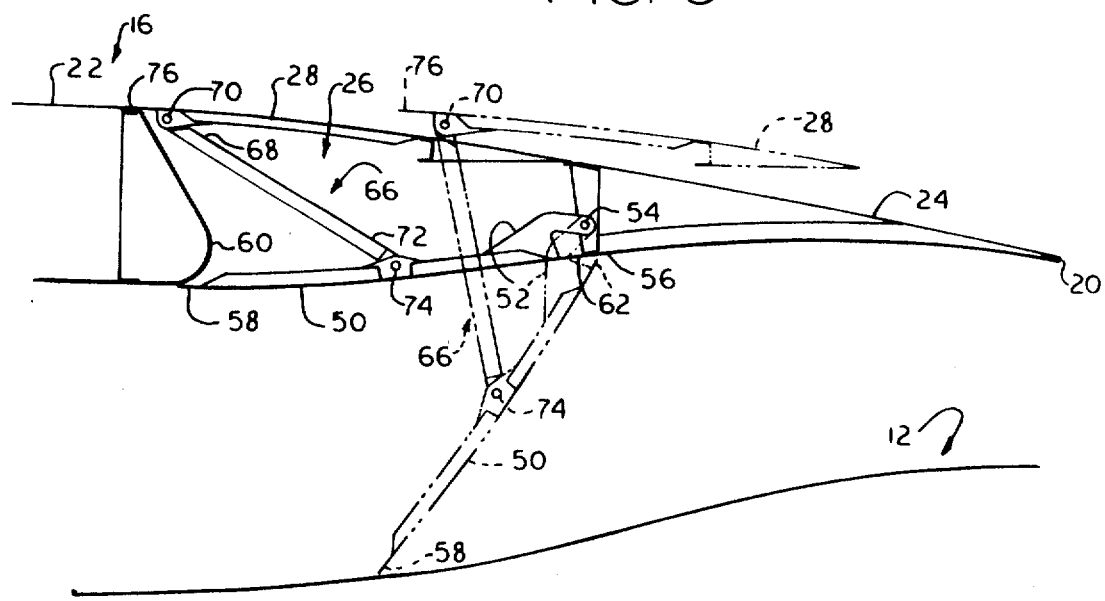
FIG. 2 is a schematic sectional view in elevation illustrating the relation of the principal components of the invention.

The shroud, near its aft end, as shown in FIGS. 2 and 3, is divided into a forward section 22 and an aft section 24 which is axially rearwardly spaced from the forward section to form a substantially complete annular outflow passage 26 through which the airstream may exit for thrust reversal. Closure means is provided for the outer end of the passage in the form of a sleeve 28 which, in stowed position as shown in solid lines, overlies the outer end and blocks both inward and outward flow. The sleeve is axially movable rearward to deployed position as shown in broken lines to permit the airstream to flow outward. Any suitable means may be provided to support and guide the sleeve for axial movement, and may take the form illustrated in FIG. 4, where a pair of channel-shaped guide tracks 30 are fixedly mounted on the axially extending support strut 32 which connects the aft section of the shroud to the forward section. A bracket 34 connected to the inner wall of the forward end of the sleeve has track followers 36 which engage in tracks 30 to guide the sleeve. A plurality of such support and guide means are spaced around the periphery of the shroud.

Suitable means for producing the axial movement of the sleeve are illustrated in FIG. 3, where a ball screw actuator 38 is shown mounted on the front wall 40 of a generally annular torque box 42. The actuator includes a rearwardly extending tube 44 surrounding an actuating rod 46 which is connected to the sleeve at 48. When the actuator is operated for deploying movement, rod 46 extends rearwardly out of tube 44. Reverse operation retracts the rod to stow the sleeve. The actuators are spaced around the periphery of the shroud in line with the support struts and may be synchronized electrically or mechanically or both.

A plurality of blocker doors 50 are arranged in peripheral proximity around the shroud and each door is provided at its aft end with a bracket 52 which is pivotally mounted at 54 to the forward end 56 of the aft section 24 of the shroud. When the doors are in stowed position as shown in solid lines they define the contour of the inner wall of the shroud between the forward and aft sections, and their leading edges 58 contact the smooth reversely bent skin 60 of the torque box which forms the forward wall of the passage, forming a seal. Their trailing edges 62 are adjacent to the forward end 56 of the aft section. When the doors are deployed they swing inward to uncover the inner end of the passage 26 and their leading edges 58 contact cowl 12 while their side edges 64 meet to block flow of the airstream through the aft section of the shroud. The doors converge forward to provide a gradual diversion of the airstream and reduce turbulence to a minimum.

A plurality of ramps 66 are provided, one for each blocker door, and they are also arranged in peripheral proximity around the shroud. It will be seen that when the sleeve and doors are in stowed position the ramps are located entirely within the passage 26 and are not subjected to the airstream flowing rearward through the shroud. The forward end 68 of each ramp is pivotally connected at 70 to the forward end of the sleeve and the aft end 72 is pivotally connected at 74 to an intermediate point on its respective blocker door. Thus the ramps serve as force-transmitting links between the sleeve and the doors, and the latter are consequently stowed and deployed in response to corresponding movement of the sleeve.

When the sleeve is fully deployed, the ramps have been moved to the position shown in broken lines, where they diverge forwardly to redirect the airstream originally diverted by the blocker doors into a flow directed outwardly and forward to produce reverse thrust. It will be noted that the leading edge 76 of the sleeve extends a short distance forward of the pivotal connections 70 and it therefore forms an annular deflecting end plate which greatly increases the forward flow component of the exiting airstream and therefore greatly increases the reverse thrust effect.

Figure 4:
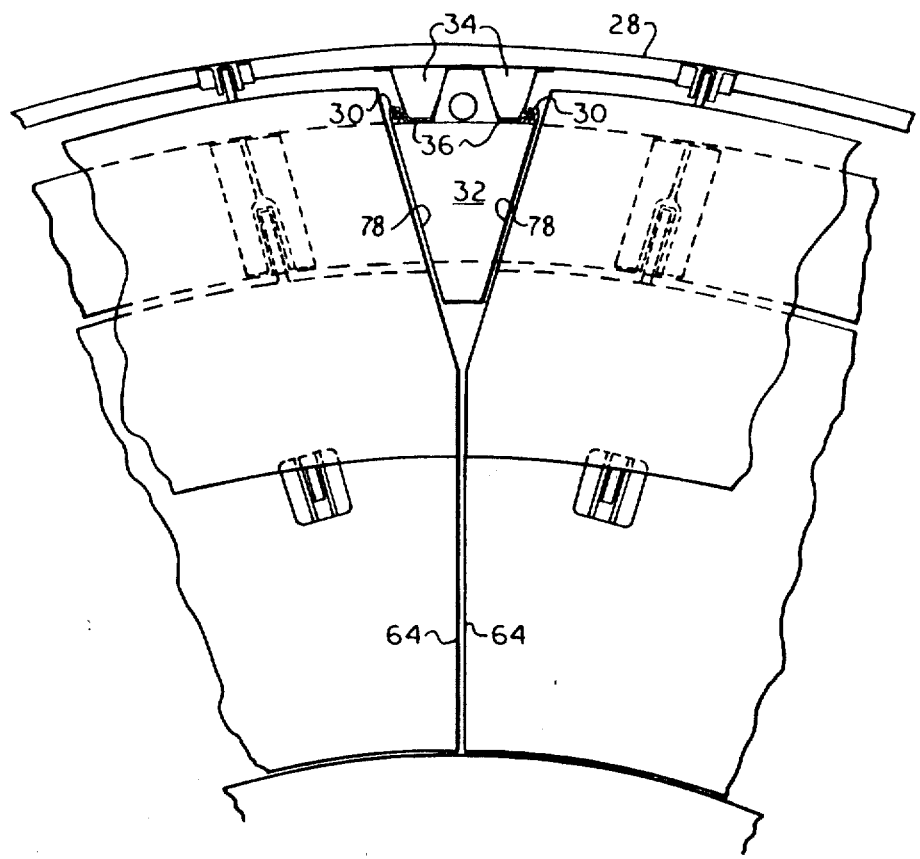
FIG. 4 is a schematic view taken generally on the line 4—4 of FIG. 3.

Support struts 32 extend fore and aft between each pair of ramps, as indicated in FIG. 4 and have a generally trapezoidal cross section. The side edges 78 of the ramps are conformed to mate with the sidewalls of the support struts when deployed in order to complete the blocking of the airstream. The reversely bent aft skin 60 of torque box 42 provides a proper contour for guiding the exiting airstream into the desired forward direction.

It will be apparent that the invention disclosed herein provides a thrust-reversing apparatus with a relatively small number of simple and rugged parts, which produces a very high degree of thrust reversal with minimal weight and complexity.

What is claimed and desired to be secured by U.S. Letters Patent is:

1. Thrust-reversing apparatus for use in combination with a jet engine enclosed in a core cowl and having a compressor fan at its forward end, comprising: a streamlined shroud surrounding the engine and having radially spaced inner and outer walls, the inner wall being radially spaced from the engine cowl to define therewith a generally annular duct for rearward flow of the propulsion airstream delivered by the fan; the inner and outer walls of the shroud converging aft to form a streamlined trailing edge forward of the trailing edge of the engine cowl; the shroud being divided into a forward section and an aft section axially spaced rearward thereof to define between them a substantially continuous laterally directed peripheral outflow passage through the inner and outer walls; closure means for the outer end of said passage movable between stowed and deployed positions to block or permit flow through the passage; a plurality of blocker doors arranged adjacent to each other around the periphery of the shroud and each pivotally connected at its aft end to the forward end of the shroud aft section; said doors being swingable inwardly to converge forwardly with their forward ends in contact with the engine cowl and their side edges in substantial sealing relation to block rearward flow of air through the shroud aft section; and a plurality of air-diverting ramps pivotally connected at their aft ends to intermediate points on the blocker doors and swingable to outwardly and forwardly diverging positions to intercept the airstream diverted by the blocker doors and direct it laterally outward through the passage with a forward flow component to produce reverse thrust.

2. Apparatus as claimed in claim 1; the closure means in stowed position defining the contour of the outer wall of the shroud between the forward section and the aft section; the blocker doors in stowed position defining the contour of the inner wall of the shroud between the forward section and the aft section and closing the inner end of the passage; and the ramps in stowed position lying in the passage between the closure means and the blocker doors and out of the airstream.

3. Apparatus as claimed in claim 1; the closure means being axially movable from a forward stowed position to an aft deployed position; and the forward ends of said ramps being pivotally connected to the forward end of the closure means and serving as force transmitting links between the closure means and the blocker doors to cause the blocker doors to move between stowed and deployed position in accordance with the movement of the closure means.

4. Apparatus as claimed in claim 3; the closure means being in the form of a sleeve overlying the outer end of the passage when in stowed position to block both inward and outward flow of air through the passage.

5. Apparatus as claimed in claim 1; and an annular torque box structure located within the forward end of the passage and provided with a smooth reversely bent skin defining the forward wall of the passage to facilitate gradual reversal of the airstream exiting through the passage.

6. Apparatus as claimed in claim 5; and a plurality of support struts extending axially between the torque box structure and the aft section; the struts being spaced peripherally around the shroud to lie between adjacent sets of blocker doors and ramps.

7. Apparatus as claimed in claim 1; the closure means being in the form of a sleeve overlying the outer end of the passage when in stowed position to block both inward and outward flow of air through the passage and defining the contour of the outer wall of the shroud between the forward section and the aft section; the sleeve being movable axially rearward to uncover the outer end of the passage; the blocker doors in stowed position defining the contour of the inner wall of the shroud between the forward section and the aft section and closing the inner end of the passage; and the forward ends of said ramps being pivotally connected to the forward end of the sleeve and serving as force transmitting links between the blocker doors and the sleeve to cause the blocker doors to move between stowed and deployed position in response to movement of the sleeve.

8. Apparatus as claimed in claim 7; the leading edge of the sleeve extending forward of the pivotal connections of the ramps to the sleeve to define an annular end plate for the ramps in deployed position extending forward of the outer ends of the ramps at an angle of approximately 90° to greatly increase the forward flow component of the exiting airstream and correspondingly increase the reverse thrust effect.

9. Thrust reversing apparatus for use in combination with a jet engine, comprising: a streamlined shroud surrounding the engine and having radially spaced inner and outer walls; the inner and outer walls of the shroud converging aft to form a streamlined trailing edge; the shroud being divided into a forward section and an aft section spaced rearward thereof to define between them a substantially continuous laterally directed peripheral outflow passage through the inner and outer walls; closure means for the outer end of said passage movable between stowed and deployed positions to block or permit flow through the passage; a plurality of blocker doors arranged adjacent to each other around the periphery of the shroud and each pivotally connected at its aft end to the forward end of the shroud aft section; said doors being swingable inward to converge forwardly in substantial sealing relation to block rearward flow of gases through the shroud aft section; and a plurality of air-diverting ramps pivotally connected at their aft ends to intermediate points on the blocker doors and swingable to outwardly and forwardly diverging positions to intercept the gas stream diverted by the blocker doors and direct it laterally outward through the passage with a forward flow component to produce reverse thrust.